United States Patent
Ogita et al.

(10) Patent No.: US 11,320,936 B2
(45) Date of Patent: May 3, 2022

(54) INPUT DEVICE, INFORMATION PROCESSING DEVICE AND INFORMATION PROCESSING METHOD FOR DETERMINING A PRESSING AMOUNT

(71) Applicant: SONY CORPORATION, Tokyo (JP)

(72) Inventors: Takeshi Ogita, Tokyo (JP); Ikuo Yamano, Tokyo (JP); Ryo Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 16/488,159

(22) PCT Filed: Jan. 31, 2018

(86) PCT No.: PCT/JP2018/003164
§ 371 (c)(1),
(2) Date: Aug. 22, 2019

(87) PCT Pub. No.: WO2018/179804
PCT Pub. Date: Oct. 4, 2018

(65) Prior Publication Data
US 2021/0141484 A1   May 13, 2021

(30) Foreign Application Priority Data

Mar. 31, 2017 (JP) .............................. JP2017-069942

(51) Int. Cl.
*G06F 3/041* (2006.01)
*G06F 3/0346* (2013.01)

(52) U.S. Cl.
CPC .......... *G06F 3/0418* (2013.01); *G06F 3/0346* (2013.01); *G06F 2203/04105* (2013.01)

(58) Field of Classification Search
CPC ................ G06F 3/0418; G06F 3/0346; G06F 2203/04105
See application file for complete search history.

(56) References Cited

U.S. PATENT DOCUMENTS

| 9,703,475 | B2 * | 7/2017 | Shinozaki | ........... G06F 3/04886 |
| 9,715,307 | B1 * | 7/2017 | Barsness | ............... G06F 3/0418 |
| 9,870,098 | B1 * | 1/2018 | Barsness | ............... G06F 3/0418 |

(Continued)

FOREIGN PATENT DOCUMENTS

| CA | 2527476 A1 | 5/2006 |
| CN | 1797305 A | 7/2006 |

(Continued)

OTHER PUBLICATIONS

International Search Report and Written Opinion of PCT Application No. PCT/JP2018/003164, dated Mar. 13, 2018, 08 pages of ISRWO.

*Primary Examiner* — David D Davis
(74) *Attorney, Agent, or Firm* — Chip Law Group

(57) ABSTRACT

An input device is provided to improve manipulation performance of a manipulation panel of an electronic apparatus. The input device includes a manipulation panel and a pressing-amount determination unit. The pressing-amount determination unit determines a pressing amount due to an input manipulation performed on the manipulation panel, using a plurality of different determination thresholds corresponding to respective regions of the manipulation panel.

11 Claims, 16 Drawing Sheets

(56) References Cited

U.S. PATENT DOCUMENTS

| | | | |
|---|---|---|---|
| 2006/0109252 A1 | 5/2006 | Kolmykov-Zotov et al. | |
| 2010/0214258 A1* | 8/2010 | Kuan | G06F 3/0418 345/174 |
| 2011/0057903 A1 | 3/2011 | Yamano et al. | |
| 2012/0256874 A1 | 10/2012 | Jiyama et al. | |
| 2013/0154842 A1* | 6/2013 | Chishima | G08B 21/182 340/665 |
| 2016/0246413 A1* | 8/2016 | Kano | G06F 3/0445 |
| 2017/0262099 A1* | 9/2017 | Nathan | G06F 3/0446 |

FOREIGN PATENT DOCUMENTS

| | | |
|---|---|---|
| CN | 102012738 A | 4/2011 |
| EP | 1659481 A2 | 5/2006 |
| EP | 2293177 A2 | 3/2011 |
| JP | 2006-146936 A | 6/2006 |
| JP | 2011-059821 A | 3/2011 |
| JP | 2012-221310 A | 11/2012 |
| WO | 2015/053249 A1 | 4/2015 |

* cited by examiner

INPUT DEVICE, INFORMATION PROCESSING DEVICE AND INFORMATION PROCESSING METHOD FOR DETERMINING A PRESSING AMOUNT

CROSS REFERENCE TO RELATED APPLICATIONS

This application is a U.S. National Phase of International Patent Application No. PCT/JP2018/003164 filed on Jan. 31, 2018, which claims priority benefit of Japanese Patent Application No. JP 2017-069942 filed in the Japan Patent Office on Mar. 31, 2017. Each of the above-referenced applications is hereby incorporated herein by reference in its entirety.

TECHNICAL FIELD

The present technology relates to a technology applied to, for example, an electronic apparatus on which a touch input manipulation can be performed, or an input device used for the electronic apparatus.

BACKGROUND ART

The cellular phone disclosed in Patent Literature 1 includes a pressure-sensitive sensor that detects a pressing force applied to a touch panel, and an acceleration sensor that detects acceleration applied to the cellular phone. The controller of the cellular phone changes an input determination threshold according to the magnitude of the acceleration detected by the acceleration sensor. This prevents a process of input determination from being performed even if, for example, a user unconsciously holds a touch panel strongly due to, for example, a shake of a train, and a pressing force applied to the touch panel is then increased. This results in preventing an erroneous input manipulation (for example, refer to paragraph [0088] of the specification and FIGS. 7A and 7B).

The input device disclosed in Patent Literature 2 includes hold determination means that determines whether a housing of the input device is held by a user, and a threshold adjustment unit that adjusts the sensitivity for detection of pressing a manipulation panel according to a result of the determination. The hold determination means detects a change in capacitance occurring due to a user touching a touch detector provided in the housing, so as to determine whether the housing is held by the user. The threshold adjustment unit changes a threshold used in a pressing-amount detector (for example, refer to paragraphs [0040] and [0056] of the specification).

CITATION LIST

Patent Literature

Patent Literature 1: Japanese Patent Application Laid-open No. 2012-027875
Patent Literature 2: Japanese Patent No. 5987993

DISCLOSURE OF INVENTION

Technical Problem

In recent years, the form of a manipulation panel of an electronic apparatus, and a method for performing an input manipulation on the manipulation panel have become diversified. There is a need for a technology for improving manipulation capability in response to such diversification.

An object of the present disclosure is to provide an input device, an information processing device, an information processing method, and a program that make it possible to improve manipulation performance of a manipulation panel.

Solution to Problem

In order to achieve the object described above, an input device according to an aspect includes a manipulation panel and a pressing-amount determination unit.

The pressing-amount determination unit is configured to determine a pressing amount due to an input manipulation performed on the manipulation panel, using a plurality of different determination thresholds corresponding to respective regions of the manipulation panel.

According to the present technology, the manipulation performance of the manipulation panel is improved by setting a determination threshold as appropriate according to the form of the manipulation panel or according to the method and the state of the input manipulation.

The input device includes a motion detector, a pose detector, and a determination threshold controller.

The motion detector is configured to detect a motion of an apparatus including the input device.

The pose detector is configured to detect a pose of the apparatus according to an output value of the motion detector.

The determination threshold controller is configured to variably control the determination threshold according to the detected pose.

It is possible to solve a problem in which, even if a user presses the manipulation panel with the same force when he/she performs an input manipulation, the pressing force may vary due to the difference in a pose of the apparatus and then an erroneous manipulation may occur.

The manipulation panel may have a rectangle shape that has long sides and short sides. The pose detector may be configured to detect at least a first pose of the apparatus and a pose of the apparatus that is different from the first pose, the first pose being a pose in which a gravitational component in parallel with the short side is greater than a gravitational component in parallel with the long side.

The pose detector may be configured to detect, as a second pose, a pose of the apparatus in which the gravitational component in parallel with the long side is greater than the gravitational component in parallel with the short side, the second pose being different from the first pose.

The pose detector may be configured to detect, as the pose different from the first pose, a pose of the apparatus in which a gravitational component vertical to the manipulation panel is greater than both the gravitational component in parallel with the short side and the gravitational component in parallel with the long side.

The pose detector may be configured to at least distinguish between a certain state and another state to detect the first pose, the certain state being a state in which a first short-side's side is held by a user, the first short-side's side being one of sides of the short sides of a housing of the apparatus, the other state being a state in which a second short-side's side of the housing is held by the user, the second short-side's side being opposite to the first short-side's side. This results in the input device being able to prevent a user's erroneous manipulation from occurring due to the difference in a holding state of the input device, if the user holds either the first short-side's side or the second short-side's side of the apparatus.

The pose detector may be configured to further distinguish a different state from the certain state and the other state to detect the first pose, the different state being a state in which the first short-side's side and the second short-side's side of the housing are both held by the user.

The determination threshold controller may be configured to variably control the determination threshold according to the distinguished and determined holding state.

The pressing-amount determination unit may be configured to acquire a detected pressing force applied to the manipulation panel and to determine the pressing amount according to the pressing force. The input device may further include a correction unit that corrects the pressing force according to the output value of the motion detector. This results in being able to improve an accuracy of the determination of a pressing amount using a determination threshold.

The pressing-amount determination unit may have a plurality of staged determination thresholds for each region regarding at least one region from among the regions of the manipulation panel. The present technology makes it possible to reduce the occurrence of an erroneous manipulation even when a plurality of staged determination thresholds with which an erroneous manipulation is more likely to occur, is adopted.

An information processing device according to an aspect is an information processing device used for an apparatus including a manipulation panel, and includes an acquisition unit and a pressing-amount determination unit.

The acquisition unit is configured to acquire a detection value of a pressing force due to an input manipulation performed on the manipulation panel.

The pressing-amount determination unit is configured to determine a pressing amount due to the input manipulation according to the detection value of the pressing force, using a plurality of different determination thresholds corresponding to respective regions of the manipulation panel.

An information processing method according to an aspect is an information processing method used for an apparatus including a manipulation panel.

A detection value of a pressing force due to an input manipulation performed on the manipulation panel, is acquired.

A pressing amount due to the input manipulation is determined according to the detection value of the pressing force, using a plurality of different determination thresholds corresponding to respective regions of the manipulation panel.

A program according to an aspect causes an information processing device to perform the information processing method.

Advantageous Effects of Invention

As described above, the present technology makes it possible to improve the manipulation performance of an apparatus.

Note that the effect described here is not necessarily limitative and may be any effect described in the present disclosure.

MODE(S) FOR CARRYING OUT THE INVENTION

Embodiments according to the present technology will now be described below with reference to the drawings.

1. Configuration of Electronic Apparatus

Figure 1:
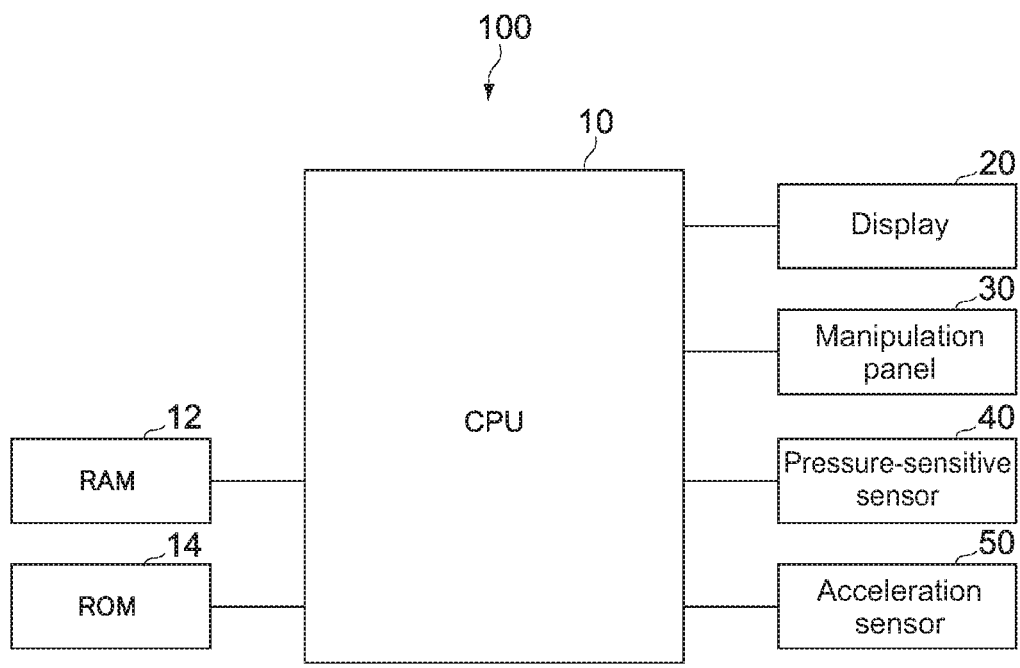
FIG. 1 is a block diagram of a configuration of hardware of an electronic apparatus that includes an input device according to a first embodiment of the present technology.

FIG. 1 is a block diagram of a configuration of hardware of an electronic apparatus that includes an input device according to an embodiment of the present technology. Typically, an electronic apparatus 100 is portable computer equipment as typified by a smartphone and a tablet computer.

The electronic apparatus 100 includes a CPU (Central Processing Unit) 10, a RAM (Random Access Memory) 12, a ROM (Read Only Memory) 14, a display 20, a manipulation panel 30, a pressure-sensitive sensor 40, and an acceleration sensor 50.

Figure 2:
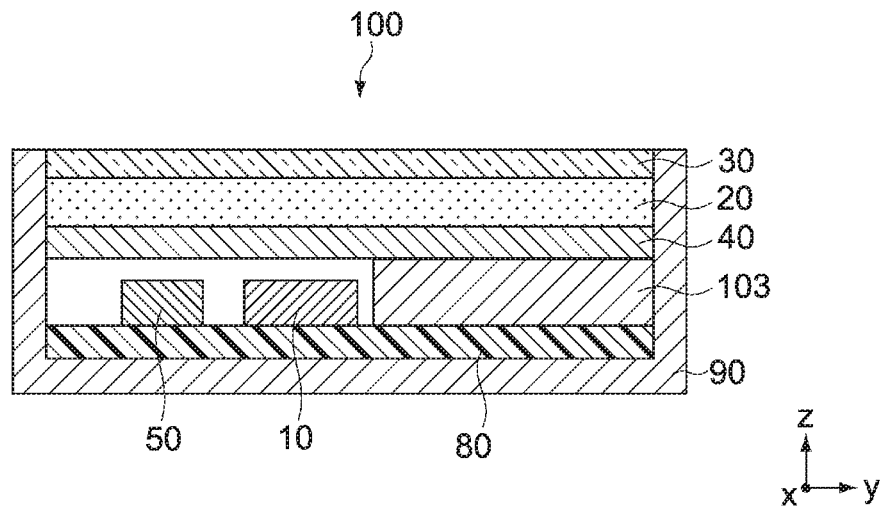
FIG. 2 is a schematic cross-sectional view of a structure of the electronic apparatus.

FIG. 2 is a schematic cross-sectional view of a structure of the electronic apparatus 100. The electronic apparatus 100 includes a circuit substrate 80 inside a housing 90. A display structure is provided in an opening in an upper portion of the housing 90. For example, the display structure has a configuration in which the pressure-sensitive sensor 40, the display 20, and the manipulation panel 30 are arranged from the bottom in this order. An IC chip such as the CPU 10, the acceleration sensor 50, and a battery 103 are primarily provided on the circuit substrate 80.

The manipulation panel 30 is a touch panel on which an input manipulation can be performed by a user's touch manipulation. Typically, a capacitive panel is used as the manipulation panel 30, but a pressure-sensitive or resistant panel may be used.

The pressure-sensitive sensor 40 is a device that detects a pressing force applied to the manipulation panel 30 by a user performing an input manipulation on the manipulation panel 30. As illustrated in FIG. 2, the area of the pressure-sensitive sensor 40 is substantially equal to the area of the display 20 and the area of the manipulation panel 30. However, a plurality of pressure-sensitive sensors whose area is smaller than the area of the display 20 and the area of the manipulation panel 30, may be provided within a plane of the display 20 (within an x-y plane).

The acceleration sensor 50 serves as a "motion detector" that detects a motion of the electronic apparatus 100. A three-axis acceleration sensor is favorably used as the acceleration sensor 50.

The ROM 14 stores therein software. Each function of the present technology is provided by the hardware described above and the software deployed in the RAM 12 cooperating with each other.

In the manipulation panel 30 and the pressure-sensitive sensor 40 of this electronic apparatus 100, a plurality of different determination thresholds used to determine a pressing amount due to an input manipulation performed by a user, is set correspondingly to respective regions constituting an entire manipulation region 35 of the manipulation panel 30. Specific examples of this are described below.

2. Determination Threshold of Pressing Amount in Each Region of Manipulation Panel

2.1) Example 1

Figure 3:
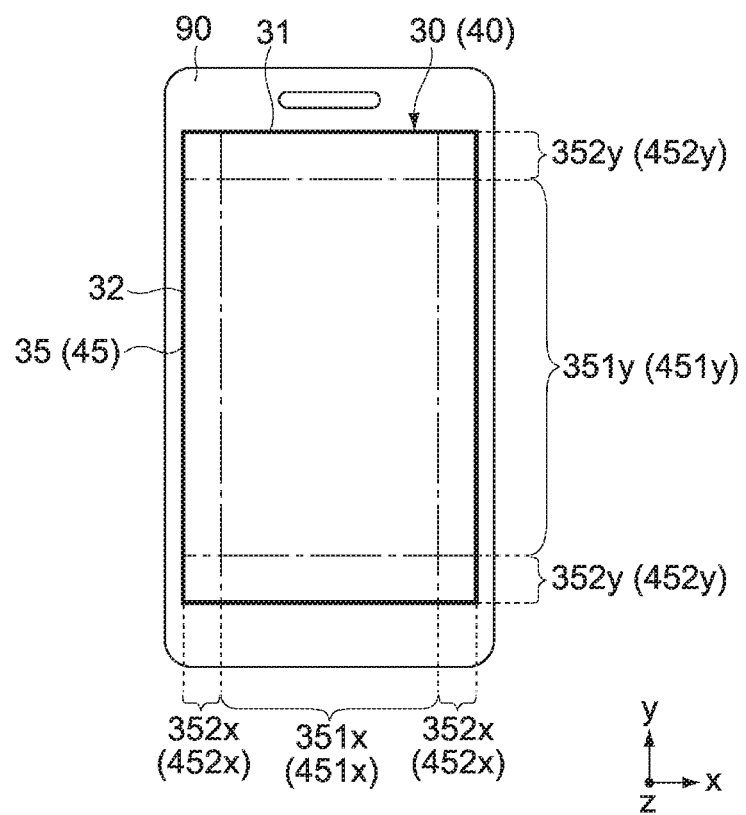
FIG. 3 illustrates a smartphone as an example of the electronic apparatus.

FIG. 3 illustrates a smartphone as an example of the electronic apparatus 100 described above. Directions in parallel with a short side 31 and a long side 32 of the manipulation panel 30 (or the display 20) of the smartphone are respectively defined as an x direction and a y direction. As illustrated in FIG. 2, the entire manipulation region 35 on the manipulation panel 30, an entire display region of the display 20, and an entire detection region 45 on the pressure-sensitive sensor 40 are provided to correspond to one another on x and y axes.

The "entire manipulation region" refers to an entire region that can be manipulated on the manipulation panel 30. The "entire detection region" refers to an entire region that can be detected on the pressure-sensitive sensor 40. In the following descriptions, in order to understand descriptions more easily, the entire manipulation region 35 referring to an entire region and "manipulation regions" obtained by dividing the entire manipulation region 35 are distinguished. Likewise, the entire detection region 45 and "detection regions" obtained by dividing the entire detection region 45 are distinguished.

As illustrated in FIG. 3, the entire manipulation region 35 of the manipulation panel 30 is essentially divided into three manipulation regions $351x$, $352x$, and $352x$ in the x direction, and divided into three manipulation regions $351y$, $352y$, and $352y$ in the y direction. The entire manipulation region 35 is divided into nine manipulation regions in totality. The entire detection region 45 is also divided into nine manipulation regions to correspond to the respective manipulation regions. In other words, three detection regions $451x$, $452x$, and $452x$ are provided in a z direction, and three detection regions $451y$, $452y$, and $452y$ are provided in the y direction. Then, a determination threshold is preset to each of these detection regions.

The CPU 10 acquires a detection value of a pressing force that is detected by the pressure-sensitive sensor 40 when a user performs an input manipulation, and determines, according to the detection value, a pressing amount due to the input manipulation. In this case, the CPU 10 and a program used to perform the determination respectively serve as an "acquisition unit" and a "pressing-amount determination unit", and serves as an information processing device that includes these units.

The entire detection region 45 is constituted of detection regions obtained by dividing the entire detection region 45 into three regions in the x direction, the three regions being an end region $452x$, a center region $451x$, and an end region $452x$. Further, the entire detection region 45 is constituted of detection regions obtained by dividing the entire detection region 45 into three regions in the y direction, the three regions being an end region $452y$, a center region $451y$, and an end region $452y$. The end region $452x$ (or $452y$) may be defined as a region in a range of 5 to 20% of all the entire detection region 45 in the x direction (or the y direction) from an edge in the x direction (or the y direction). The center region $451x$ (or $451y$) is a region situated between the two end regions $452x$ (or $452y$).

Figure 4A:
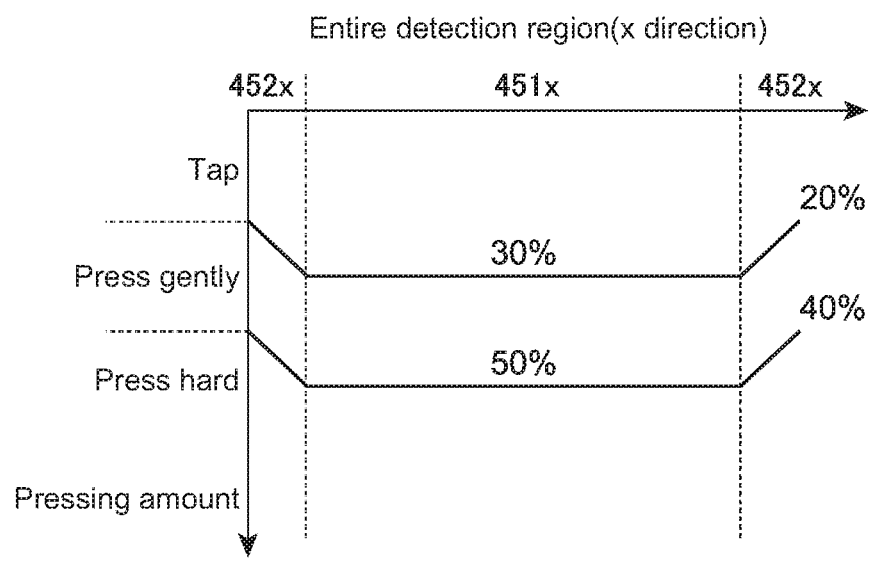
FIGS. 4A and 4B illustrate determination thresholds of a pressing amount in a detection target region of a pressure-sensitive sensor in an x direction and a y direction.
Figure 4B:
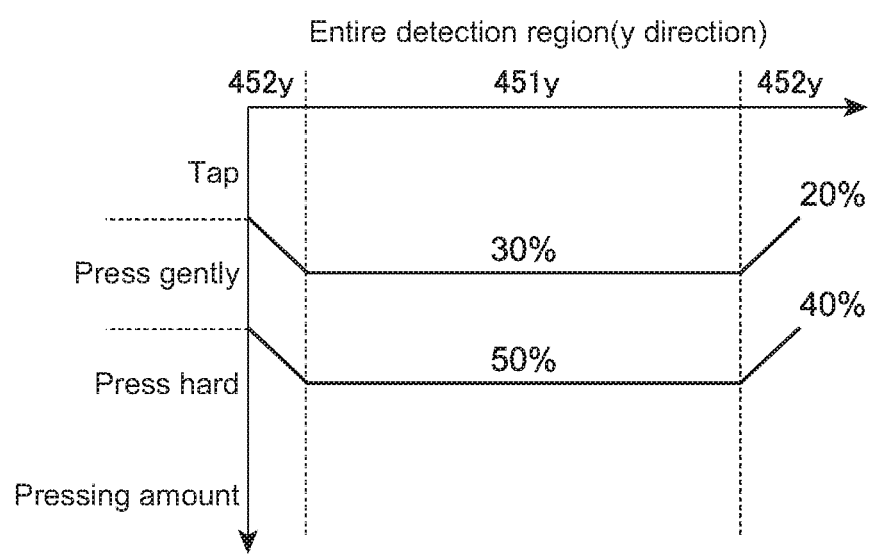

FIGS. 4A and 4B illustrate determination thresholds of a pressing amount in the entire detection region 45. A horizontal axis of FIG. 4A represents a position in the entire detection region 45 of the pressure-sensitive sensor 40 in the x direction. A horizontal axis of FIG. 4B represents a position in the entire detection region 45 of the pressure-sensitive sensor 40 in the y direction. It is assumed that the amount of a determination threshold in a vertical axis becomes larger toward a downward direction in each of the figures.

As illustrated in FIG. 4A, a determination threshold in the center region $451x$ is different from a determination threshold of the end region 452x in the x direction. A determination threshold lower than that of the center region 451x, is set to the end region 452x. When a dynamic range for detection is 100%, the determination threshold of the center region 451x is, for example, 30% (50%). The determination threshold of the end region 452x is set to a range between 20% (40%) and 30% (50%). In the end region 452x, the determination threshold is set such that determination threshold becomes lower toward the edge. In this sense, it is also considered that the end region 452x is further divided into small regions in the x direction.

As illustrated in FIG. 4B, a determination threshold in the center region 451y is also different from a determination threshold of the two end regions 452y in the y direction, in which a determination threshold lower than that of the center region 451y, is set to the end region 452y. The determination thresholds of these regions are set to values equal to those in the x direction.

Most users feel that it is difficult to press the end region 452x (452y) of the manipulation panel 30, compared with the center region 451x (451y). Thus, a pressing force applied to the end region 452x (452y) tends to be weaker than a pressing force applied to the center region 451x (451y) even if a user thinks that he/she is applying the same pressing force. Accordingly, as described above, a determination threshold higher than that of the end region 452x (452y) is set to the center region 451x (451y).

Note that the determination threshold in the end region 452x (452y) may be constant.

Further, regarding at least one region from among all of the detection regions on the pressure-sensitive sensor 40 (over the entire detection region 45 in the present embodiment), a plurality of staged determination thresholds (two determination thresholds in the present embodiment) is set for each region. For example, it is possible to detect pressing forces in three stages such as "tap" (first range), "press gently" (second range), and "press hard" (third range).

As illustrated in FIGS. 4A and 4B, the first range is a range between greater than 0% and not greater than 20% in the end region 452x, and is a range between greater than 0% and not greater than 30% in the center region 451x (451y). The second range is a range between greater than 20% and not greater than 40% in the end region 452x (452y), and is a range between greater than 30% and not greater than 50% in the center region 451x (451y). The third range is a range greater than 40% in the end region 452x (452y), and is a range greater than 50% in the center region 451x (451y). Design variations can be made to these values as appropriate.

2.2) Example 2

Figure 5:
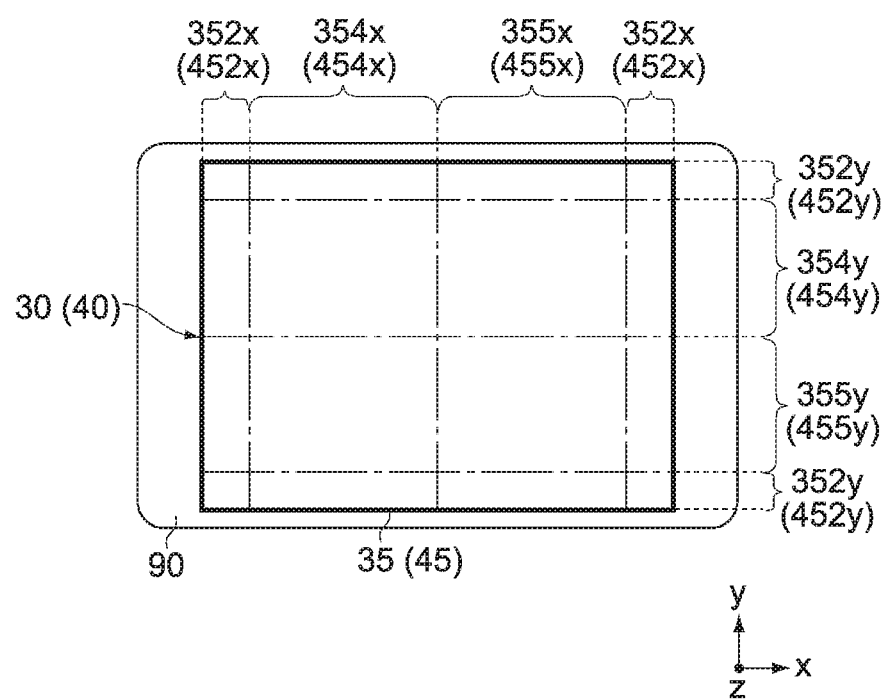
FIG. 5 illustrates a tablet computer as an example of the electronic apparatus.

FIG. 5 illustrates a tablet computer as an example of the electronic apparatus 100. Directions in parallel with the long side 32 and the short side 31 of the manipulation panel 30 of the tablet computer are respectively defined as the x direction and the y direction.

As in the case of FIGS. 4A and 4B, FIGS. 6A and 6B respectively illustrate determination thresholds of a pressing amount in the x direction and the y direction in the entire detection region 45 of the pressure-sensitive sensor 40 of the tablet computer. In the tablet computer, the entire detection region 45 is constituted of detection regions obtained by dividing the entire detection region 45 into 16 regions in total in the x and y directions. The entire detection region 45 is constituted of the two end regions 452x (452y), a first region 454x (454y), and a second region 455x (455y) in the x direction (y direction), the first region 454x (454y) and the second region 455x (455y) being situated between the two end regions 452x (452y).

Figure 6A:
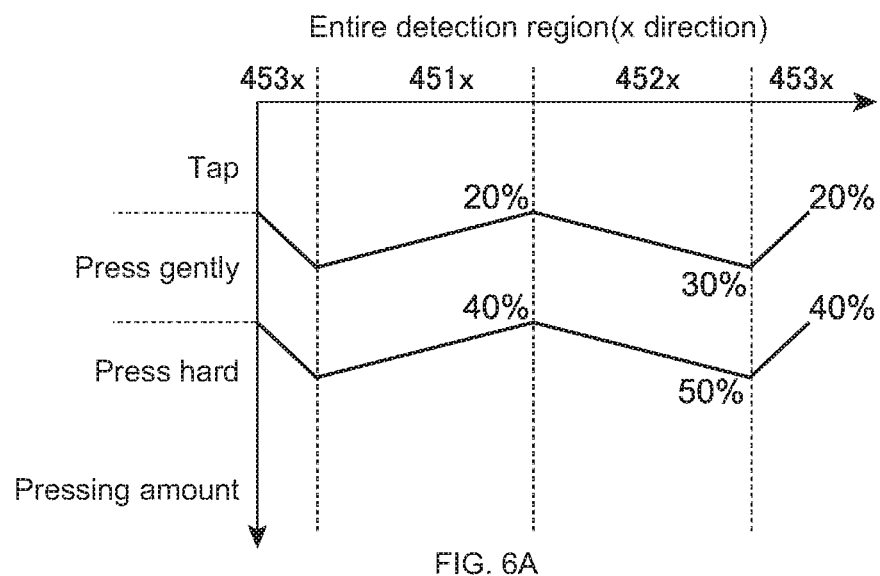
FIGS. 6A and 6B respectively illustrate determination thresholds of a pressing amount in the x direction and the y direction in a detection target region of the pressure-sensitive sensor of the tablet computer.

As illustrated in FIG. 6A, the determination threshold of the two end region 452x (452y) in the x direction is equal to the determination threshold illustrated in Example 1 (FIG. 4A). In the first region 454x (454y) and the second region 455x (455y), the determination thresholds are set such that the respective determination thresholds become lower toward a point of a boundary between the first region 454x (454y) and the second region 455x (455y). At the point of their boundary, the determination threshold is 20% (40%). The determination threshold at a point of a boundary between the end region 452x (452y) and the first region 454x (454y), is 30% (50%). Likewise, the determination threshold at a point of a boundary between the end region 452x (452y) and the second region 455x (455y), is also 30% (50%). In this example, a plurality of staged determination thresholds is also set for one detection region, as in the case of Example 1.

Figure 6B:
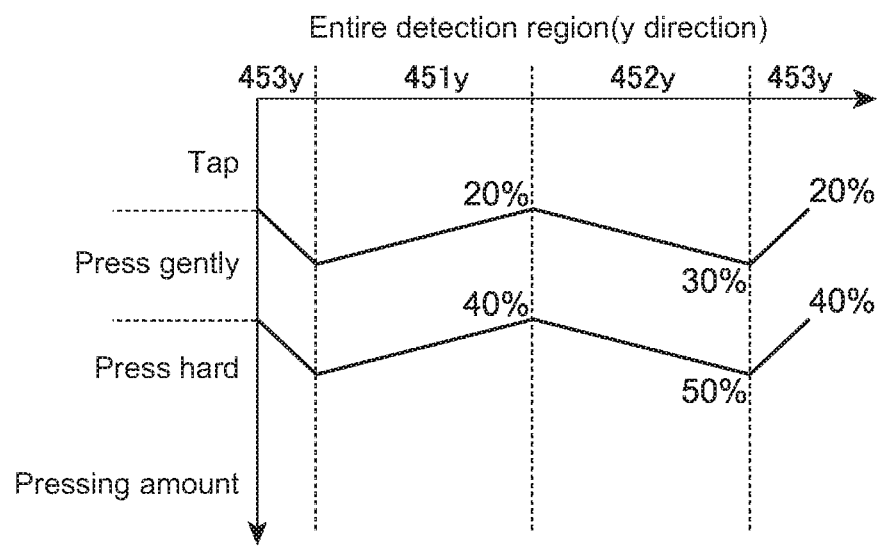

As illustrated in FIG. 6B, the determination thresholds in the y direction are equal to those of the x direction.

In a tablet computer, the housing 90 and the manipulation panel 30 are larger than those of a smartphone. For this reason, the manipulation panel 30 bends easily at its center portion. Thus, the determination threshold is set such that the determination threshold becomes lower toward a central position of the manipulation panel 30 (a position of a boundary between the first region 454x (454y) and the second region 455x (455y)).

2.3) Example 3

Figure 7A:
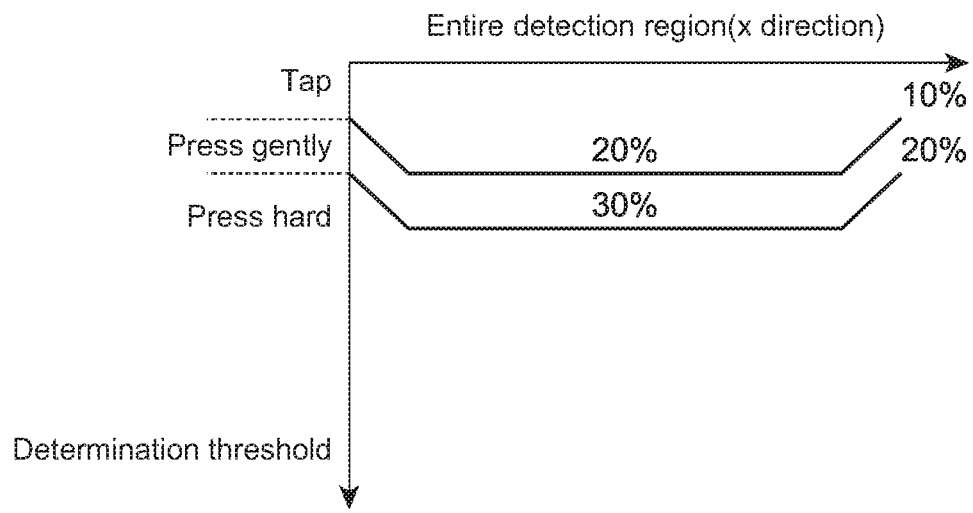
FIGS. 7A and 7B respectively illustrate determination thresholds of a pressing amount in the x direction and the y direction in a detection target region of the pressure-sensitive sensor.
Figure 7B:
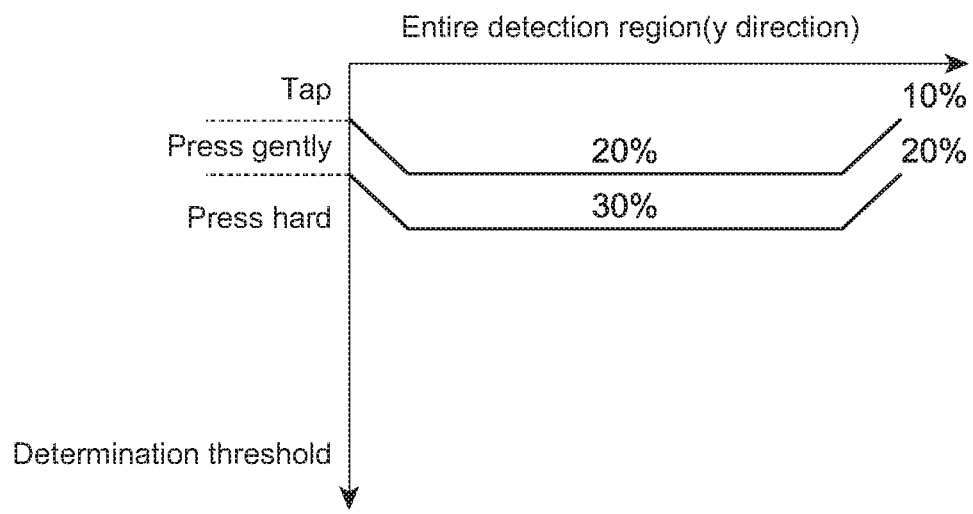

FIGS. 7A and 7B illustrate determination thresholds of a pressing amount in the x and y directions in the entire detection region 45 in a wearable computer such as a smartwatch taken as an example of the electronic apparatus 100. The wearable computer is not illustrated here, but the lengths in the x direction and the y direction of the manipulation panel 30 and the pressure-sensitive sensor 40 are different from each other. However, these lengths may be equal to each other.

As in the case of a smartphone, the entire detection region 45 is constituted of detection regions obtained by dividing the entire detection region 45 into nine regions. The manipulation panel of a wearable computer is smaller than that of a smartphone, so a user feels that it is difficult to press it. Thus, low determination thresholds are globally set. Further, a determination threshold lower than that of the center region, is set to the end region, and the determination threshold becomes lower toward the edge.

As described above in Examples 1 to 3, it is possible to improve the manipulation performance of the manipulation panel 30 by setting a determination threshold as appropriate according to the form of the manipulation panel 30.

3. Holding State in which User Holds Electronic Apparatus, and Pose of Electronic Apparatus Due to Holding State Next, a holding state in which a user holds the electronic apparatus 100, a pose of the electronic apparatus 100 due to the holding state, and a method for detecting the pose, are described. A smartphone that includes the manipulation panel (or the display 20) is taken as an example of the electronic apparatus 10, the manipulation panel 30 being rectangular and having the two facing short sides 31 and the two facing long sides 32.

For example, the acceleration sensor 50 is used as a sensor for detecting a pose. In this case, the CPU 10 and a program used for the detection serve as a "pose detector" that detects a pose of the electronic apparatus 100 according to an output value of the acceleration sensor 50.

3.1) Lateral Pose

3.1.1) Holding State 1

Figure 8A:
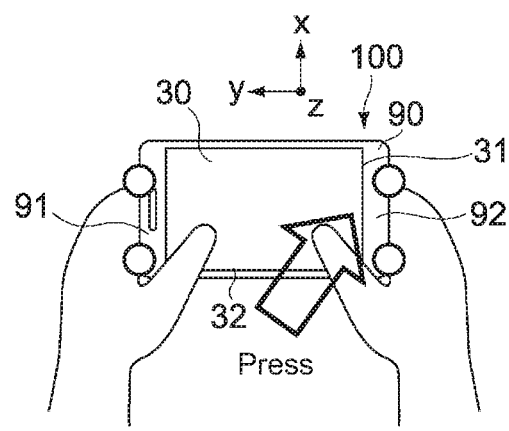
FIG. 8A illustrates a holding state 1 of a user when the electronic apparatus is in a lateral pose (first pose).

FIG. 8A illustrates a holding state 1 of a user when the electronic apparatus 100 is in a lateral pose (first pose). The lateral pose is a pose in which the electronic apparatus 100 is held when the long side 32 of the manipulation panel 30 is horizontal or nearly horizontal. More precisely, the lateral pose is a pose in which a gravitational component in parallel with the short side 31 of the manipulation panel 30 is greater than a gravitational component in parallel with the long side 32. For example, it is possible to detect these gravitational components using the acceleration sensor 50.

It is sufficient if a gravitational component is detected for pose detection. Thus, even if at least one of the x axis, the y axis, or a z axis is obliquely oriented, the pose will be detected as a lateral pose by meeting the requirement that a gravitational component in parallel with the short side 31 of the manipulation panel 30 is greater than a gravitational component in parallel with the long side 32.

The holding state 1 is a state in which the electronic apparatus 100 is in the lateral pose, and is a state in which a user holds, in the respective hands, two sides of the short sides 31 of the housing 90 of the electronic apparatus 100, that is, a first short-side's side 91 and a second short-side's side 92. In this state, as represented by white circles in the figure, at least two points on the first short-side's side 91 and two points on the second short-side's side 92 are fixed by the user's hands as represented by white circles, which results in making the pose of the electronic apparatus 100 stable.

Figure 8B:
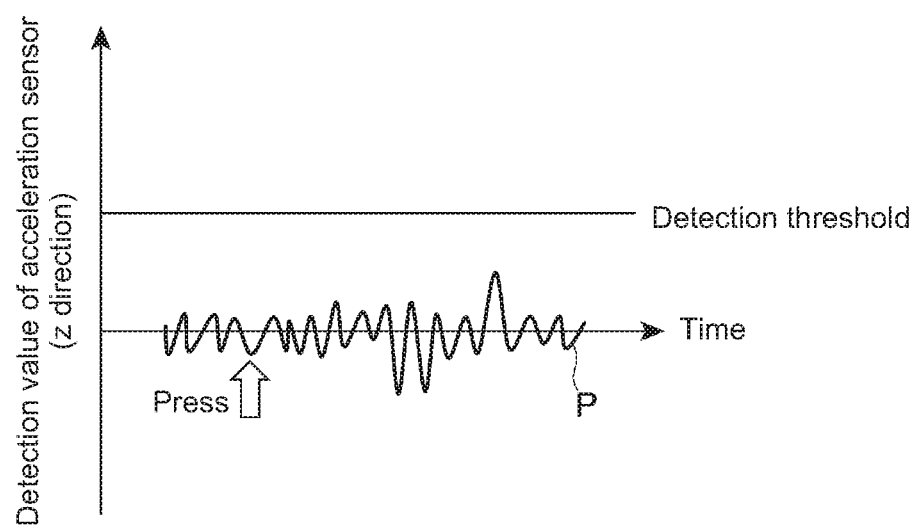
FIG. 8B is a graph illustrating an example of a temporal change in an output value of an acceleration sensor in a z direction in the holding state 1.

FIG. 8B is a graph illustrating an example of a temporal change in an output value of the acceleration sensor 50 in the z direction when a user performs a pressing manipulation on the manipulation panel 30, with the electronic apparatus 100 being held in the holding state 1. The output value of the acceleration sensor 50 may also be hereinafter referred to as an "acceleration value". A detection threshold for detecting a holding state in a vertical axis, is set relatively high. In particular, a detection threshold is set at least to a value sufficiently larger than a value of an output waveform P due to a hand-induced shake. Design variations can be made to the detection threshold as appropriate.

It is assumed that, in FIG. 8B, a user performs a pressing manipulation on the manipulation panel 30 at a position of time represented by an arrow. In the example of FIG. 8B, the acceleration of the housing 90 in a pressing direction, that is, the acceleration value of the housing 90 in a direction in parallel with the z axis does not exceed a preset detection threshold. Even if a pressing manipulation is performed, a user is tightly holding the housing 90 in both hands. Thus, acceleration applied to the housing 90 by a pressing manipulation is close to zero, and only acceleration applied to the housing 90 due to a hand-induced shake, is virtually detected.

As described above, even if a pressing manipulation is performed by a user, the CPU 10 can determine that the state is the holding state 1 of a "lateral/holding-in-both-hands state" if acceleration in parallel with the pressing manipulation does not exceed a detection threshold.

3.1.2) Holding States 2 and 3

Figure 9A:
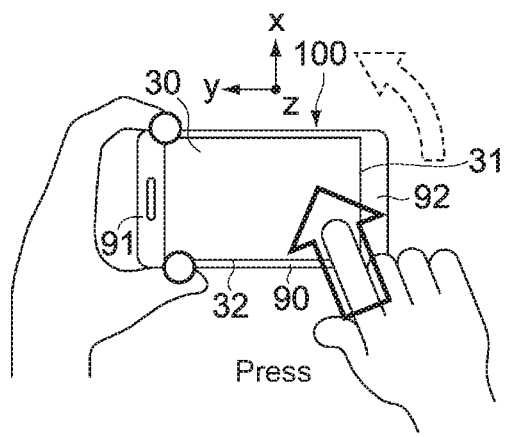
FIGS. 9A and 9B respectively illustrate other holding states 2 and 3 of a user when the electronic apparatus is in the lateral pose (first pose).
Figure 9B:
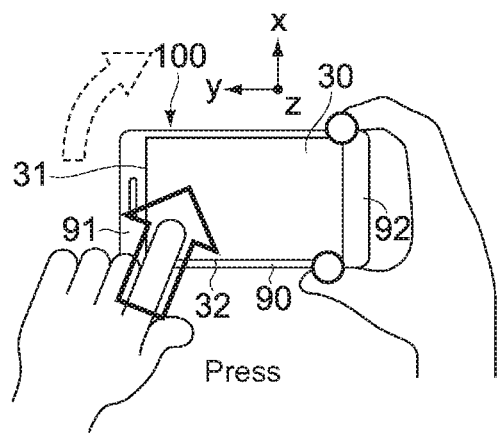

FIGS. 9A and 9B respectively illustrate other holding states 2 and 3 of a user when the electronic apparatus 100 is in the lateral pose (first pose). The holding state 2 illustrated in FIG. 9A is a state in which only the first-short side's side 91 of the housing 90 is held by a user. The holding state 3 illustrated in FIG. 9B is a state in which only the second short-side's side 92 of the housing 90 is held by a user.

These holding states 2 and 3 are states in which only two points on the respective side of the short side of the housing 90 are held, and thus the electronic apparatus 100 is in an unstable pose. When a pressing manipulation is performed by a user in the holding state 2,3 in the direction in parallel with the z axis, the housing 90 rotates about the x axis around the first short-side's side 91 (or the second short-side's side 92), and moves such that the position of the housing 90 is shifted from an initial position as illustrated in FIG. 8A. In particular, the housing 90 enters a more easily rotatable state as the position on which a pressing manipulation is performed, is farther away from the first short-side's side 91 (or the second short-side's side 92).

In particular, the pose of the housing 90 becomes unstable when, for example, performing a manipulation of "press" ("press gently", or "press hard") whose pressing amount is greater than the pressing amount of "tap" and is a next-stage pressing amount. Such input manipulations of "tap" and "press" are sometimes used for a shutter button that is a function of a camera (a two-staged manipulation of automatic focusing and taking a photo).

Figure 9C:
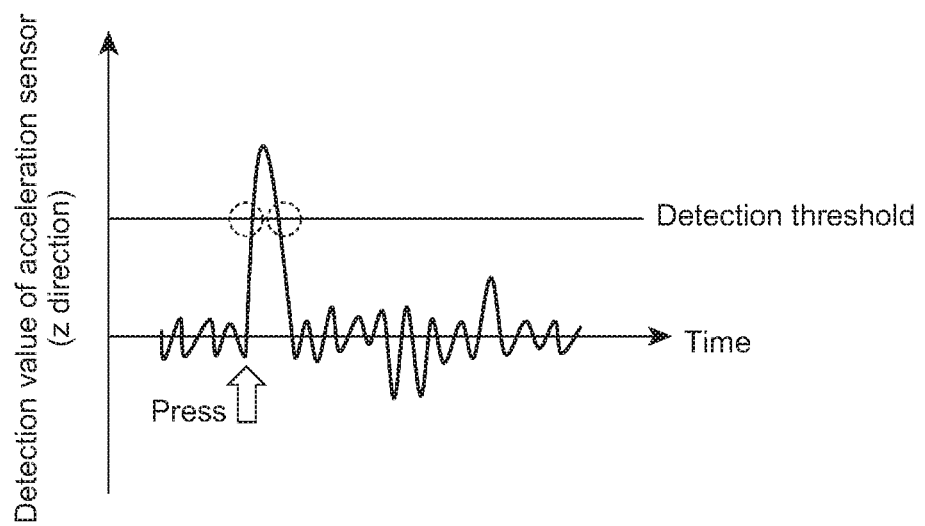
FIG. 9C is a graph illustrating an example of a temporal change in an output value of the acceleration sensor in the z direction in the holding states 2 and 3.

FIG. 9C is a graph illustrating an example of a temporal change in an output value of the acceleration sensor 50 in the z direction when a user performs a pressing manipulation on the manipulation panel 30, with the electronic apparatus 100 being held in the holding states 2 and 3. In the holding states 2 and 3, when a pressing manipulation is performed, the position of the housing 90 is shifted as illustrated in FIGS. 9A and 9B. Thus, a force due to the movement of shift is added to the output value output by the acceleration sensor 50 in the z direction. Accordingly, when the acceleration value exceeds a detection threshold, the CPU 10 can determine that the holding state in which the housing 90 is being held by a user, is the holding state 2 or 3.

Further, the CPU 10 acquires an acceleration value in the y direction so that the CPU 10 can distinguish between the holding state 2 and the holding state 3 using the sign (plus or minus) of the acceleration value. For this reason, a motion sensor such as an acceleration sensor is favorably arranged in a position as close to the center as possible in the y direction.

As described above, the CPU 10 can not only distinguish the holding state 1 described above but also distinguish between these holding states 2 and 3, to detect the lateral pose of the electronic apparatus 100.

3.2) Longitudinal Pose (Holding State 4)

Figure 10:
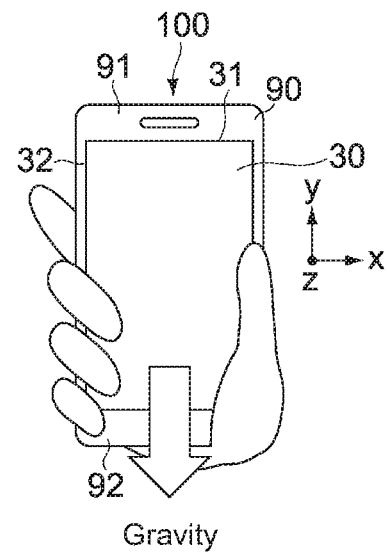
FIG. 10 illustrates a holding state 4 of a user when the electronic apparatus is in a longitudinal pose (second pose).

FIG. 10 illustrates a holding state 4 of a user when the electronic apparatus 100 is in a longitudinal pose (second pose). The longitudinal pose is a pose in which the short side 31 of the manipulation panel 30 is held in a horizontal or nearly horizontal state. More precisely, the longitudinal pose is a pose in which a gravitational component in parallel with the long side 32 of the manipulation panel 30 is greater than a gravitational component in parallel with the short side 31. The CPU 10 can detect the longitudinal pose by, for example, these gravitational components being detected by the acceleration sensor 50.

3.3) Placed-on Pose

Figure 11:
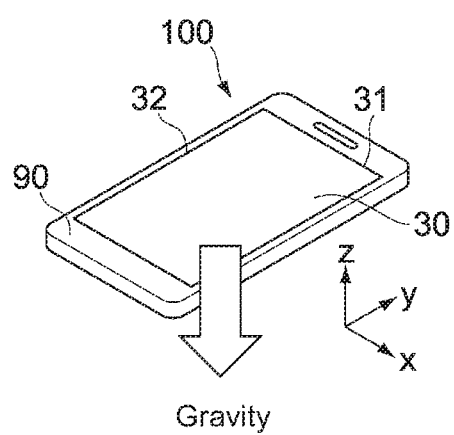
FIG. 11 illustrates a placed-on pose in which the electronic apparatus is placed on a horizontal plane such as a desk or a floor.

FIG. 11 illustrates a placed-on pose in which the electronic apparatus 100 is placed on a horizontal plane such as a desk or a floor. Essentially, the placed-on pose is a state in which the housing 90 is not being held by a user. More precisely, the placed-on pose is a pose of the electronic apparatus 100 in which a gravitational component vertical to the manipulation panel 30 is greater than both of the gravitational components in parallel with the short side 31 and the long side 32. Thus, the placed-on pose is not limited to the pose in which the electronic apparatus 100 is placed on the horizontal plane, and may be an inclined pose in which the manipulation panel 30 has an angle with respect to a horizontal plane. The CPU 10 can detect the placed-on pose by, for example, these gravitational components being detected by the acceleration sensor 50.

Note that the housing 90 of the electronic apparatus 100 may be being held by a user even if the electronic apparatus 100 is in the placed-on pose.

3.4) Application to Other Electronic Apparatuses

The above-described method for detecting the poses and the holding states of the electronic apparatus 100 is not limited to being applicable to a smartphone, but is also applicable to other portable computers.

4. Method for Determining Pressing Amount

4.1) Process of Detecting Pose and Determining Pressing Amount

Figure 12:
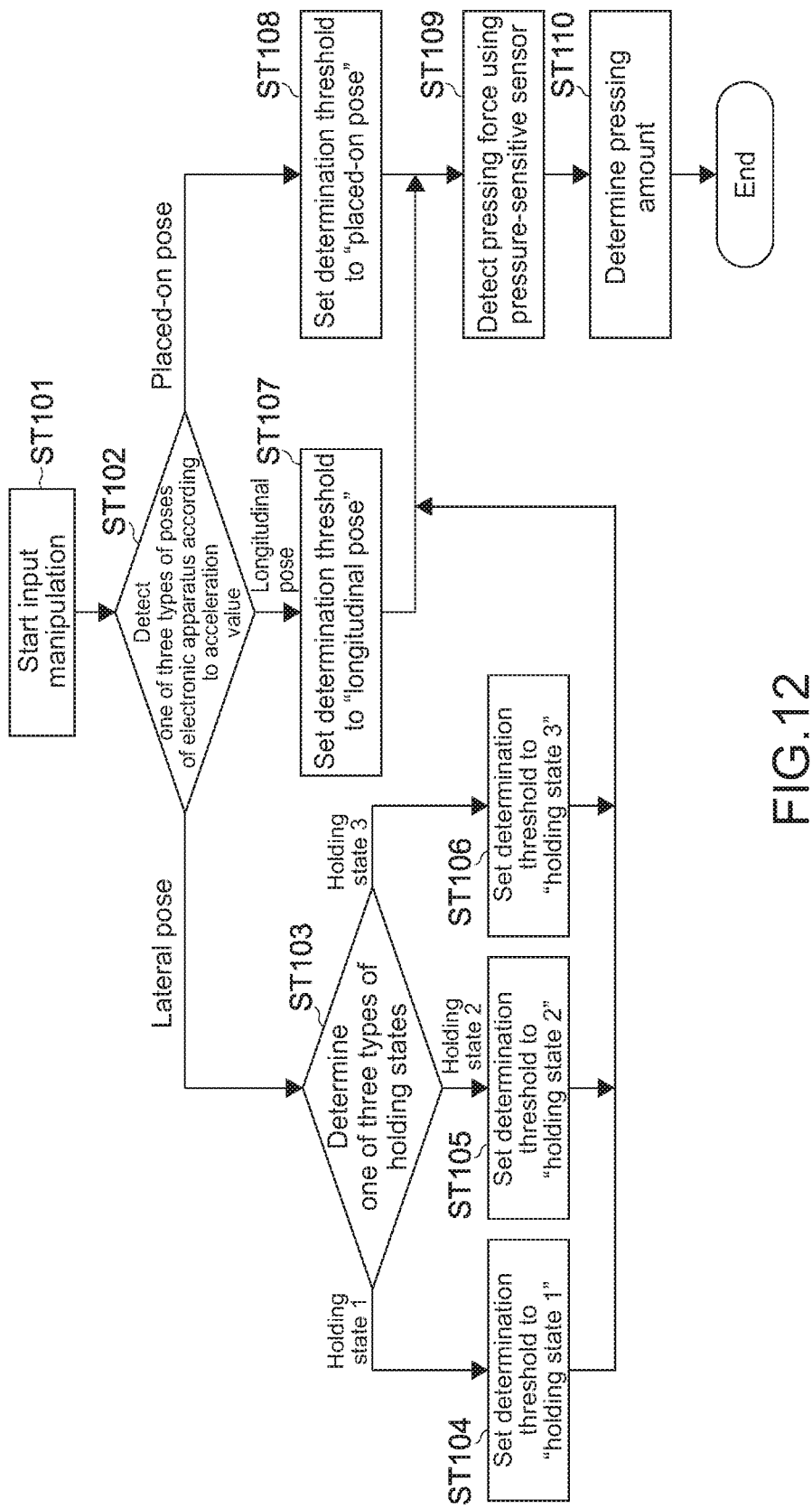
FIG. 12 is a flowchart of a process including detecting a pose and determining a pressing amount that is performed by the electronic apparatus.

Next, a method for determining a pressing amount using the pressing-amount determination unit is described. In the present embodiment, the pressing amount is determined for each of the poses or each of the holding states of the electronic apparatus 100 described above. FIG. 12 is a flowchart of a process including detecting a pose and determining a pressing amount that is performed by the electronic apparatus 100.

An input manipulation (primarily, such as "tap" or "press") starts being performed by a user on the manipulation panel 30 (Step 101). After the start of the input manipulation, the CPU 10 starts detecting a pose of the electronic apparatus 100 within a specified period of time (for example, a few milliseconds to a few tens of milliseconds), the detecting a pose of the electronic apparatus 100 being performed in and after Step 102.

The CPU 10 acquires an acceleration value, and distinguishes to detect, according to the acceleration value, three poses that are a lateral pose, a longitudinal pose, and a placed-on pose (Step 102). Further, when the CPU 10 detects the lateral pose, the CPU 10 determines one of the three types of holding states 1, 2, and 3 using a method that uses a detection threshold of acceleration, as described above (Step 103).

Depending on the detected five states of the holding states 1, 2, and 3, the longitudinal pose (holding state 4), and the placed-on pose, the CPU 10 controls respective determination thresholds variably (Steps 104 to 108). In this case, the CPU 10 and a program used for the control serve as a "determination-threshold controller".

The CPU 10 detects a pressing force due to the input manipulation using the pressure-sensitive sensor 40 (Step 109). According to the pressing force, the CPU 10 determines a pressing amount using a determination threshold set in one of Steps 104 to 108 (Step 110).

4.2) Example of Determination Threshold

Next, examples of setting a determination threshold in Steps 104 to 108 are described.

4.2.1) Example 1

Figure 13:
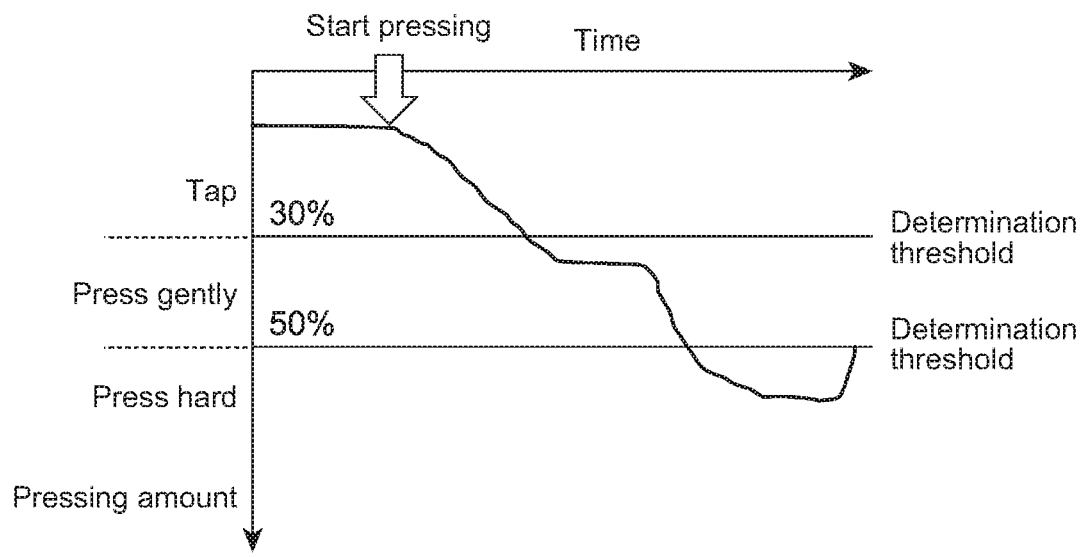
FIG. 13 is a graph illustrating an example of a determination threshold applied to the holding state 1 in the lateral pose.

FIG. 13 is a graph illustrating an example of a determination threshold applied to the "holding state 1" in the lateral pose. Note that, in this example, pressing amounts in three stages each having two determination thresholds, that is, "tap", "press gently", and "press hard", are determined. The same applies to the holding states 2 and 3, the longitudinal pose, and the placed-on pose.

As described above, it is assumed that a dynamic range for a detection performed by the pressure-sensitive sensor 40 is 100%. In this case, "tap" is in a range not greater than 30%, "press gently" is in a range between greater than 30% and not less than 50%, and "press hard" is in a range greater than 50%. The CPU 10 determines pressing amounts in three stages using these determination thresholds of 30% and 50%.

In the example of FIG. 13, the determination threshold of the center region 451x of the manipulation panel 30 (the pressure-sensitive sensor 40) is taken as an example, as described referring to FIGS. 4A and 4B, and likewise, the example of FIG. 13 may be applied to the determination threshold of the end region 452x. The same applies to the holding states 2 and 3, the longitudinal pose, and the placed-on pose.

Figure 14:
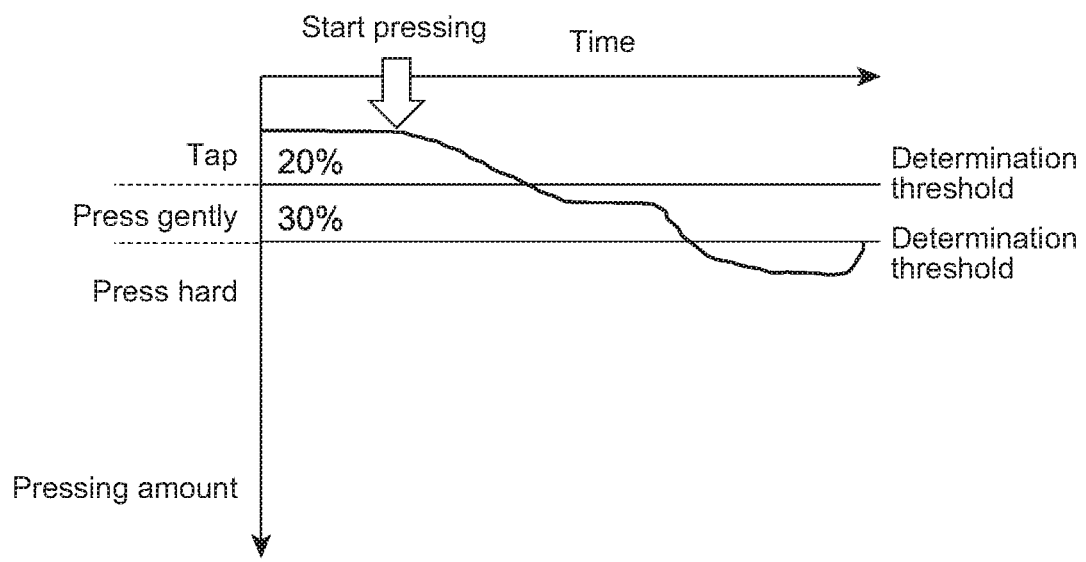
FIG. 14 is a graph illustrating an example of a determination threshold applied to the holding state 2 or the holding state 3 in the lateral pose.

FIG. 14 is a graph illustrating an example of a determination threshold applied to the "holding state 2" or the "holding state 3" in the lateral pose.

As described above, the electronic apparatus 100 is in an unstable state in the holding states 2 and 3. If the determination thresholds of FIG. 13 are applied to these holding states 2 and 3, the user's manipulation may actually be determined to be "tap" even if the user thinks that he/she pressed the manipulation panel 30 gently. Further, the user's manipulation may be determined to be "press gently" even if the user thinks that he/she pressed the manipulation panel 30 hard. In other words, even if a user presses the manipulation panel 30 with the same force, the pressing force may vary and then an erroneous manipulation may occur. Thus, as illustrated in FIG. 14, a relatively low determination threshold is applied for the holding states 2 and 3, which results in solving the problem described above.

Note that it is sufficient if, after changing the determination threshold, the CPU 10 keeps a determination threshold after the change for a specified period of time, and then returns to a determination threshold before the change. The specified period of time is about a few seconds to a few tens of seconds, and, for example, about 5 to 20 seconds. It is sufficient if the CPU 10 keeps, as a base setting, a setting of the determination threshold illustrated in FIG. 13, changes the determination threshold of the base setting to the determination threshold illustrated in FIG. 14, keeps the determination threshold after the change for a specified period of time, and then returns to the determination threshold of the base setting. The specified period of time may be changed by a user.

Since the pose of the electronic apparatus 100 is stable in the holding state 4 of the longitudinal pose, for example, the determination threshold illustrated in FIG. 13 is applicable.

Figure 15:
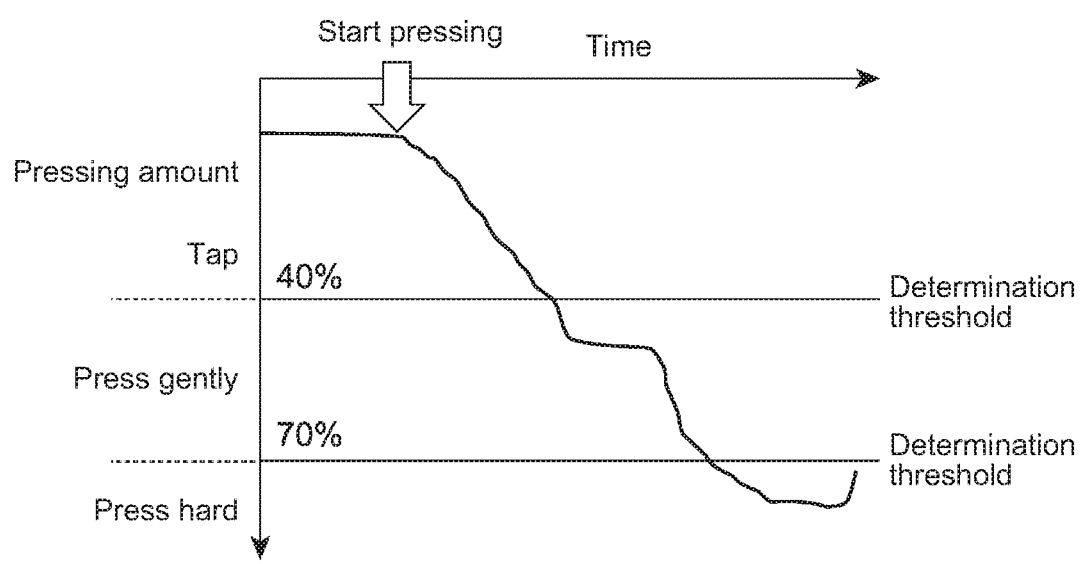
FIG. 15 is a graph illustrating an example of a determination threshold applied to the placed-on pose.

FIG. 15 is a graph illustrating an example of a determination threshold applied to the placed-on pose. "Tap" is in a range not greater than 40%, "press gently" is in a range between greater than 40% and not greater than 70%, and "press hard" is in a range greater than 70%. As described above, the highest determination threshold is applied to the placed-on pose since the electronic apparatus 100 is in a most stable state in the placed-on pose. Alternatively, the determination threshold applied to the placed-on pose may be the determination threshold illustrated in FIG. 13.

As described above, the present technology makes it possible to prevent a user's erroneous manipulation from occurring due to the difference in a pose or a holding state of the electronic apparatus 100.

4.2.2) Example 2

Figure 16A:
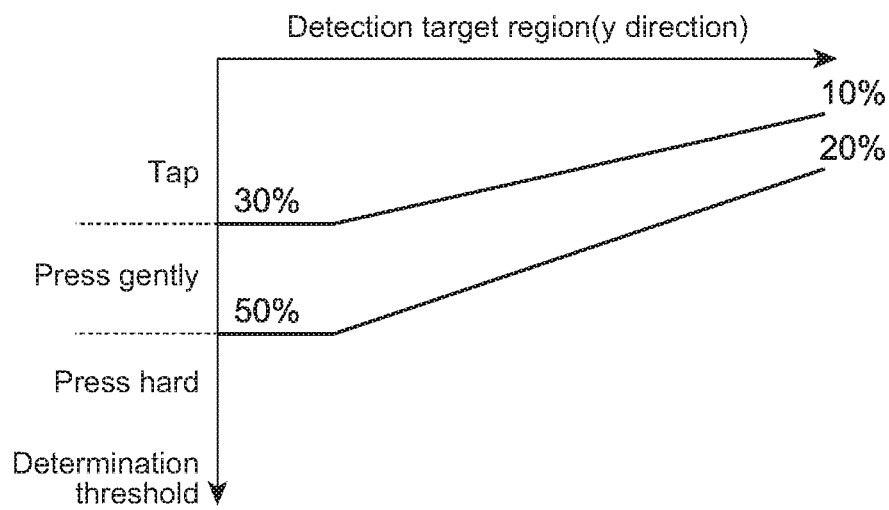
FIGS. 16A and 16B illustrate examples of determination thresholds respectively applied to the holding states 2 and 3 of the lateral pose.
Figure 16B:
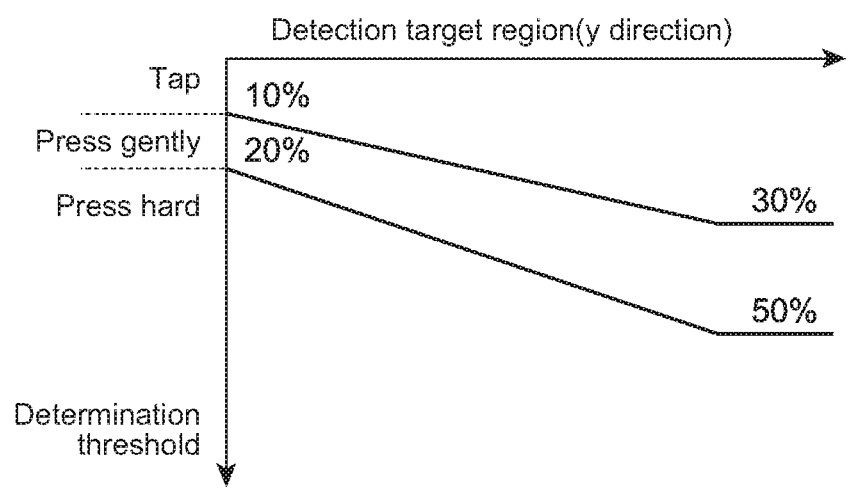

Next, other examples of a determination threshold are described. FIG. 16A illustrates an example of a determination threshold applied to the holding state 2 of the lateral pose. FIG. 16B illustrates an example of a determination threshold applied to the holding state 3 of the lateral pose. The respective horizontal axes each represent the entire detection region 45 of the pressure-sensitive sensor 40 in the y direction (refer to FIGS. 9A and 9B).

In this example, the idea that the determination threshold varies depending on the detection region, is applied to the holding states 2 and 3, the idea having been described in, for example, FIGS. 4A and 4B. The detection region of a high determination threshold (for example, 30% and 50%) in the entire detection region 45 corresponds to a side of a holding position. The holding position in the example illustrated in FIG. 16A is the first short-side's side 91 (a left-hand's side), and the holding position in the example illustrated in FIG. 16B is the second short-side's side 92 (a right-hand's side). The determination threshold is set such that the determination threshold becomes lower as the position in the entire detection region 45 is farther away from the holding position in the y direction. The lowest determination threshold in the entire detection region 45 is set to, for example, 10% and 20%.

In the holding states 2 and 3, the housing 90 is greatly shifted more easily if the position in the entire detection region 45 is farther away from the holding position. The settings of the determination thresholds illustrated in FIGS. 16A and 16B make it possible to effectively reduce a user's erroneous manipulation due to the housing 90 being shifted.

Note that, in the holding states 2 and 3, it is sufficient if the determination threshold of the entire detection region 45 in the x direction is set, for example, as in the example illustrated in FIG. 4A.

Figure 17:
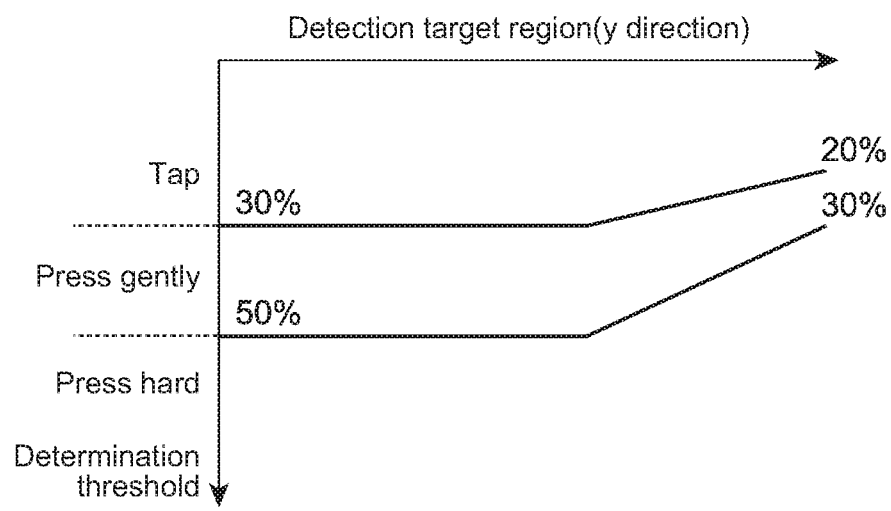
FIG. 17 illustrates an example of a determination threshold for each detection region applied to the holding state 4 of the longitudinal pose.

FIG. 17 illustrates an example of a determination threshold applied to the holding state 4 of the longitudinal pose. The horizontal axis represents, for example, the entire detection region 45 of the pressure-sensitive sensor 40 in the y direction (refer to FIG. 10). The detection region of a high determination threshold in the entire detection region 45 (for example, 30% and 50%) corresponds to a side of a holding position (the second short-side's side 92 situated in a lower portion). The determination threshold is set such that the determination threshold becomes lower toward the first short-side's side 91 in the y direction from the center or from a position above the center. The lowest determination threshold in the entire detection region 45 is set to, for example, 20% and 30%.

In the holding state 4, the housing 90 is greatly shifted more easily if the position in the entire detection region 45 is farther away from the holding position. The setting of the determination threshold illustrated in FIG. 17 makes it possible to effectively reduce a user's erroneous manipulation due to the housing 90 being shifted.

Note that, in the holding state 4, it is sufficient if the determination threshold of the entire detection region 45 in the x direction is set, for example, as in the example illustrated in FIG. 4A.

Figure 18:
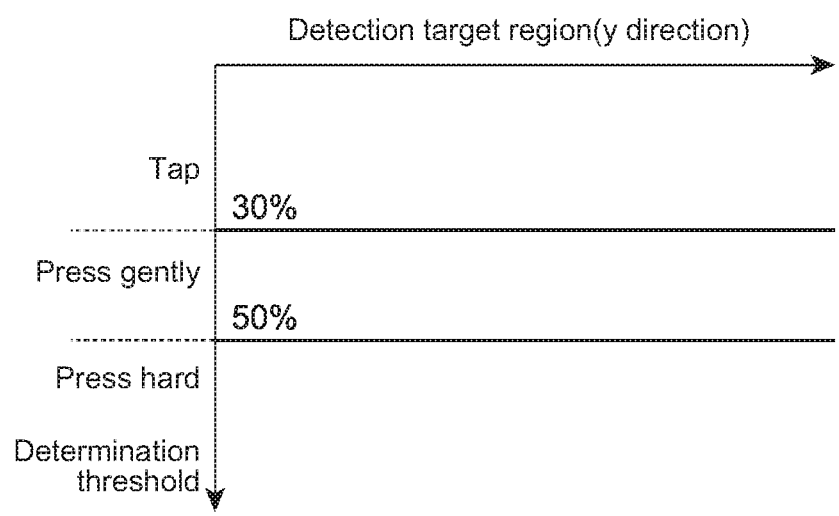
FIG. 18 illustrates an example of a determination threshold for each detection region applied to the holding state 1 of the lateral pose.

FIG. 18 illustrates an example of a determination threshold applied to the holding state 1 of the lateral pose. The horizontal axis represents, for example, the entire detection region 45 of the pressure-sensitive sensor 40 in the y direction (refer to FIG. 8A).

Figure 19:
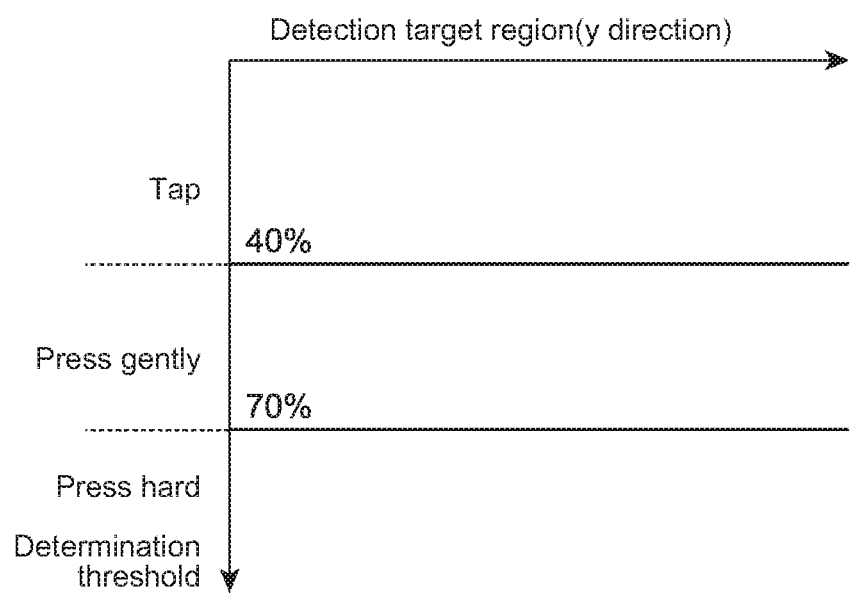
FIG. 19 illustrates an example of a determination threshold for each detection region applied to the placed-on pose.

FIG. 19 illustrates an example of a determination threshold applied to the placed-on pose. The horizontal axis represents, for example, the entire detection region 45 of the pressure-sensitive sensor 40 in the y direction (refer to FIG. 11A).

The housing 90 is stable in the holding state 1 and the placed-on pose. Thus, as illustrated in FIGS. 18 and 19, the determination threshold for each detection region may be constant. Alternatively, the determination threshold may be set, in the y direction, high in the center region $451y$ of the entire detection region 45 and low in the end region $452y$, as illustrated in FIG. 4B. Likewise, the determination threshold may be constant or may be set in the x direction, as illustrated in FIG. 4A.

Figure 20:
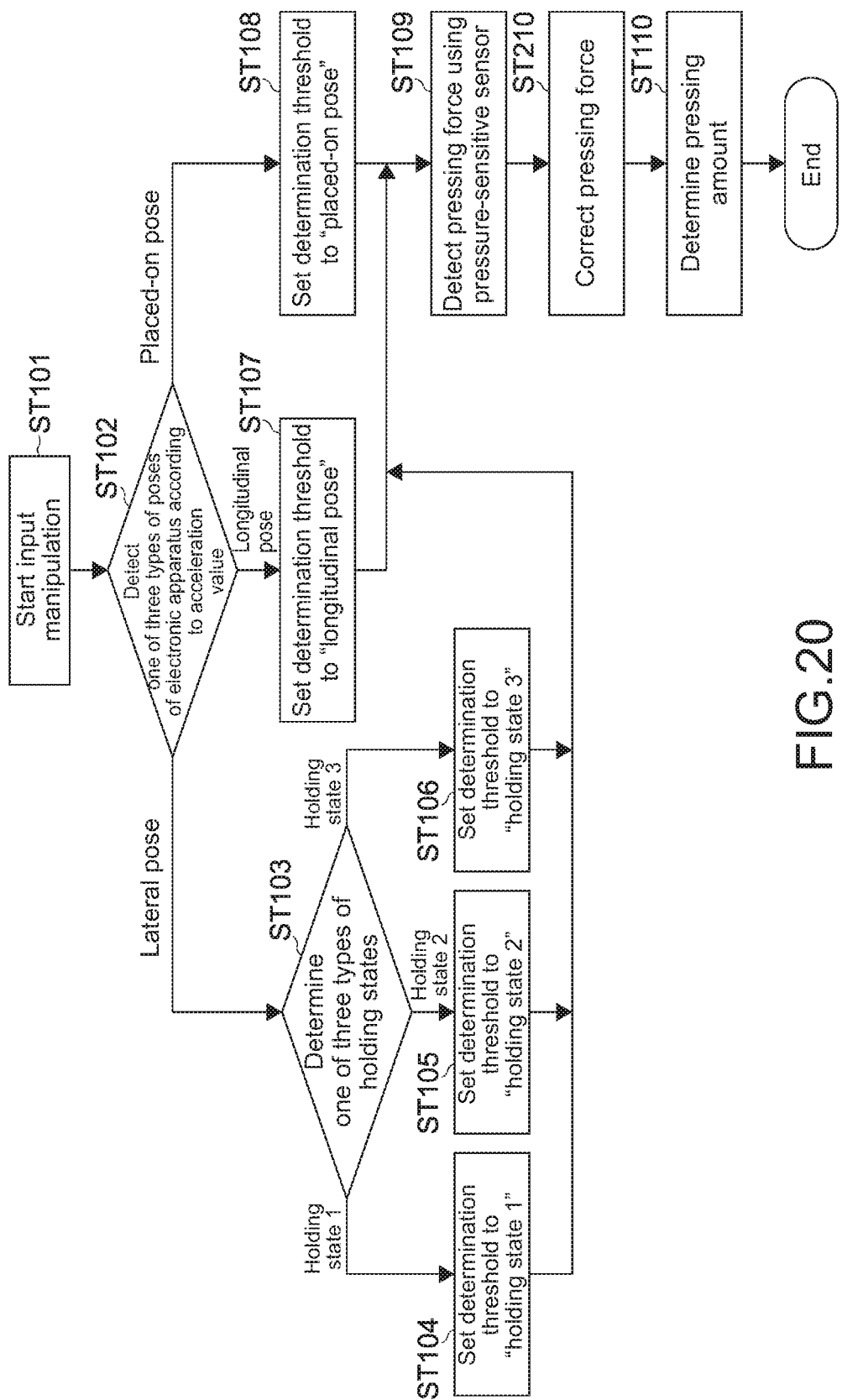
FIG. 20 is a flowchart of a process including detecting a pose and determining a pressing amount according to another embodiment.

4.3) Process of Detecting Pose and Determining Pressing Amount According to Another Embodiment FIG. 20 is a flowchart of a process including detecting a pose and determining a pressing amount according to another embodiment. This flowchart is different from the flowchart of FIG. 12 in Step 210 being added.

In Step 210, the CPU 10 corrects the pressing force detected in Step 109 according to the acceleration value. In this case, the CPU 10 and a program used for the correction serve as a "correction unit".

Figure 21A:
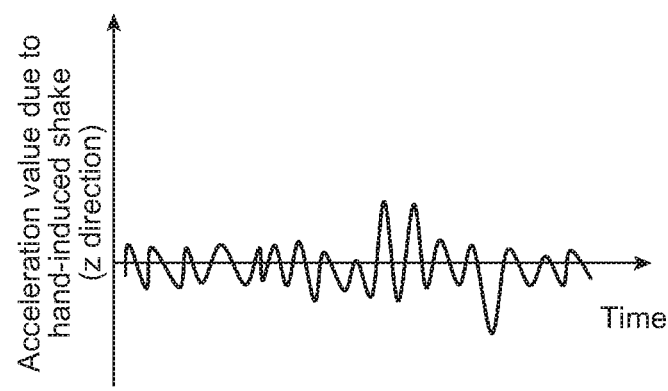
FIG. 21A illustrates an output value (acceleration value) that is output due to a shake induced by the user's hand.
Figure 21B:
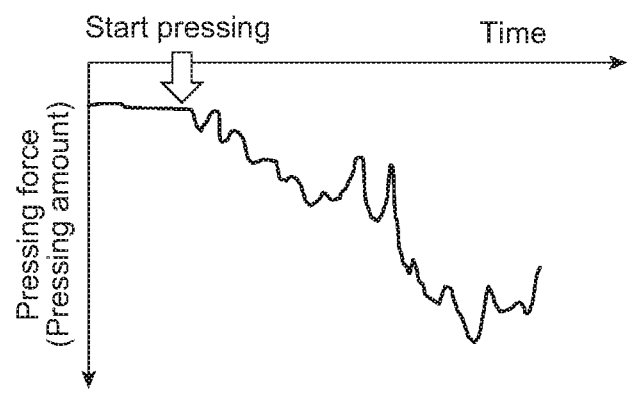
FIG. 21B is a graph of a pressing force before correction regarding a hand-induced shake.

FIG. 21A illustrates an output value of the acceleration sensor 50 (acceleration value) that is output due to, for example, a shake induced by the user's hand. This acceleration value is a value in parallel with the z direction, that is, a direction vertical to the manipulation panel 30. FIG. 21B is a graph illustrating an example in which a pressing force detected using the pressure-sensitive sensor 40 is affected by a shake induced by the user's hand when the user performs a manipulation of pressing the manipulation panel 30.

Figure 21C:
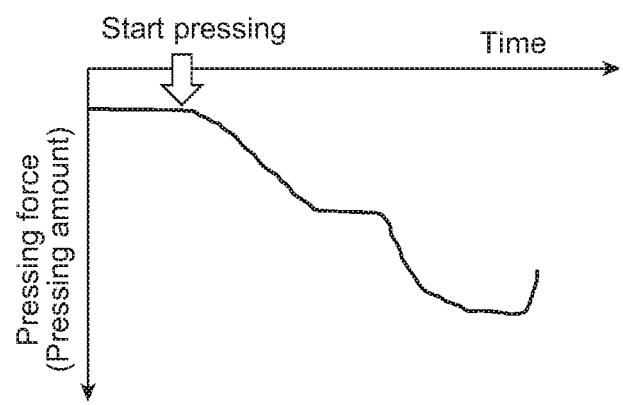
FIG. 21C is a graph of an example of a pressing force after correction regarding a hand-induced shake.

The CPU 10 subtracts a value based on an acceleration value from a pressing force affected by a hand-induced shake. The CPU 10 sequentially performs this calculation for each unit time. The value based on an acceleration value is a value obtained by, for example, multiplying the acceleration value by a coefficient. The coefficient is a value determined by a design as appropriate. This permits the CPU 10 to acquire a value of a pressing force from which an acceleration value due to a hand-induced shake has been removed, as illustrated in FIG. 21C. Consequently, it is possible to improve an accuracy of the determination of a pressing amount in Step 110.

Of course, the value to be subtracted does not necessarily have to be an acceleration value due to a hand-induced shake. For example, the value to be subtracted may be a value due to a shake occurring when a vehicle such as a train or an automobile is travelling. Alternatively, the value to be subtracted may be an acceleration obtained by combining the hand-induced shake and the shake occurring when a vehicle is travelling.

5. Other Various Embodiments

The present technology is not limited to the embodiments described above, but can realize other various embodiments.

In the embodiments described above, the electronic apparatus 100 may include a program that permits a user to customize a determination threshold of a pressing amount.

The present technology is applicable not only to an input device including the display 20 provided with the pressure-sensitive sensor 40, but also to an input device (a touch pad) without a display. Further, regarding the application to the electronic apparatus 100, the present technology is applicable not only to a smartphone and a table computer, but also to other electronic apparatuses such as a camera and a game device.

In the embodiments described above, the acceleration sensor 50 has been taken as an example of a motion detector, but a gyroscope or other known sensors may be provided in addition to the acceleration sensor 50.

In the embodiments described above, as a determination threshold of a pressing amount, a plurality of staged determination thresholds is set for the entire detection region 45 of the pressure-sensitive sensor 40. However, one determination threshold may be set in all of the detection regions. Alternatively, one determination threshold may be set for one or more detection regions, and a plurality of staged determination thresholds may be set for one or more other detection regions that are different from the one or more detection regions.

In the embodiments described above, the number of staged determination thresholds is two, but it may be three or more.

In the embodiments described above, the pose of the electronic apparatus 100 is detected according to an output value of the acceleration sensor 50. However, in addition to being detected according to the output value of a motion detector such as the acceleration sensor 50, the pose may be detected according to a hysteresis of the output value.

In the process illustrated in FIG. 20, Step 109 and Step 210 subsequent to Step 109 can be executed every time, for example, after Step 101.

From among the characteristic portions of the embodiments described above, at least two characteristic portions can be combined.

Note that the present technology may also take the following configurations.

(1) An input device including:
a manipulation panel; and
a pressing-amount determination unit configured to determine a pressing amount due to an input manipulation performed on the manipulation panel, using a plurality of different determination thresholds corresponding to respective regions of the manipulation panel.

(2) The input device according to (1), further including:
a motion detector configured to detect a motion of an apparatus including the input device;
a pose detector configured to detect a pose of the apparatus according to an output value of the motion detector; and
a determination threshold controller configured to variably control the determination threshold according to the detected pose.

(3) The input device according to (2), in which
the manipulation panel has a rectangle shape that has long sides and short sides, and
the pose detector is configured to detect at least a first pose of the apparatus and a pose of the apparatus that is different from the first pose, the first pose being a pose in which a gravitational component in parallel with the short side is greater than a gravitational component in parallel with the long side.

(4) The input device according to (3), in which
the pose detector is configured to detect, as a second pose, a pose of the apparatus in which the gravitational component in parallel with the long side is greater than the gravitational component in parallel with the short side, the second pose being different from the first pose.

(5) The input device according to (3) or (4), in which
the pose detector is configured to detect, as the pose different from the first pose, a pose of the apparatus in which a gravitational component vertical to the manipulation panel is greater than both the gravitational component in parallel with the short side and the gravitational component in parallel with the long side.

(6) The input device according to any one of (3) to (5), in which
the pose detector is configured to at least distinguish between a certain state and another state to detect the first pose, the certain state being a state in which a first short-side's side is held by a user, the first short-side's side being one of sides of the short sides of a housing of the apparatus, the other state being a state in which a second short-side's side of the housing is held by the user, the second short-side's side being opposite to the first short-side's side.

(7) The input device according to (6), in which
the pose detector is configured to further distinguish a different state from the certain state and the other state to detect the first pose, the different state being a state in which the first short-side's side and the second short-side's side of the housing are both held by the user.

(8) The input device according to (6) or (7), in which
the determination threshold controller is configured to variably control the determination threshold according to the distinguished and determined holding state.

(9) The input device according to any one of (2) to (8), in which
the pressing-amount determination unit is configured to acquire a detected pressing force applied to the manipulation panel and to determine the pressing amount according to the pressing force, and
the input device further includes a correction unit that corrects the pressing force according to the output value of the motion detector.

(10) The input device according to any one of (1) to (9), in which
the pressing-amount determination unit has a plurality of staged determination thresholds for each region regarding at least one region from among the regions of the manipulation panel.

(11) An information processing device used for an apparatus including a manipulation panel, the information processing device including:
an acquisition unit configured to acquire a detection value of a pressing force due to an input manipulation performed on the manipulation panel; and
a pressing-amount determination unit configured to determine a pressing amount due to the input manipulation according to the detection value of the pressing force, using a plurality of different determination thresholds corresponding to respective regions of the manipulation panel.

(12) An information processing method used for an apparatus including a manipulation panel, the information processing method including:
acquiring a detection value of a pressing force due to an input manipulation performed on the manipulation panel; and
determining a pressing amount due to the input manipulation according to the detection value of the pressing force, using a plurality of different determination thresholds corresponding to respective regions of the manipulation panel.

(13) A program executed by an apparatus including a manipulation panel, in which the program
acquires a detection value of a pressing force due to an input manipulation performed on the manipulation panel, and
determines a pressing amount due to the input manipulation according to the detection value of the pressing force, using a plurality of different determination thresholds corresponding to respective regions of the manipulation panel.

REFERENCE SIGNS LIST

10 CPU
30 manipulation panel
31 short side
32 long side
35 entire manipulation region
40 pressure-sensitive sensor
45 entire detection region
50 acceleration sensor
91 first short-side's side
92 second short-side's side
100 electronic apparatus
351x, 352x, 351y, 352y manipulation region
451x, 451y detection region (center region)
452x, 452y detection region (end region)
454x, 454y detection region (first region)

The invention claimed is:

1. An input device, comprising:
a manipulation panel that includes a plurality of regions, wherein
the manipulation panel is configured to receive an input manipulation,
the manipulation panel has a plurality of long sides and a plurality of short sides, and
the input device is a part of an apparatus;
a motion detector configured to detect a motion of the apparatus;
a pose detector configured to:
detect a first pose of the apparatus based on the detected motion; and
distinguish between a first holding state and a second holding state of the apparatus in the detected first pose based on the detected motion, wherein
the first holding state corresponds to a state in which a first short side of the plurality of short sides is user held,
the second holding state corresponds to a state in which a second short side of the plurality of short sides is user held,
the first short side is opposite to the second short side, and
each of the first short side and the second short side is shorter than each long side of the plurality of long sides;
a determination threshold controller configured to variably control a plurality of determination thresholds corresponding to the plurality of regions, wherein
the plurality of determination thresholds is variably controlled based on one of the first holding state or the second holding state of the apparatus of the detected first pose,
each determination threshold of the plurality of determination thresholds corresponds to a respective region of the plurality of regions of the manipulation panel,
the plurality of determination thresholds includes a first determination threshold and a second determination threshold, and
the first determination threshold is different from the second determination threshold; and
a pressing-amount determination unit configured to determine a pressing amount of the input manipulation based on the control of the plurality of determination thresholds.

2. The input device according to claim 1, wherein
the manipulation panel has a rectangle shape, and
the pose detector is further configured to detect:
the first pose of the apparatus in which a first gravitational component is greater than a second gravitational component; and
a second pose of the apparatus different from the first pose, wherein
the first gravitational component is in parallel with at least one of the first short side or the second short side, and
the second gravitational component is in parallel with a long side of the plurality of long sides.

3. The input device according to claim 2, wherein the pose detector is further configured to detect the second pose of the apparatus in which the second gravitational component is greater than the first gravitational component.

4. The input device according to claim 2, wherein
the pose detector is further configured to detect a third pose different from the first pose,
the third pose is detected based on a third gravitational component vertical to the manipulation panel, and
the third gravitational component is greater than the first gravitational component and the second gravitational component.

5. The input device according to claim 1, wherein
the pose detector is further configured to determine a third holding state different from the first holding state and the second holding state to detect the first pose, and
the third holding state corresponds to a state in which the first short side and the second short side are user held.

6. The input device according to claim 1, wherein the determination threshold controller is further configured to variably control the plurality of determination thresholds based on each of the first holding state and the second holding state.

7. The input device according to claim 1, wherein
the pressing-amount determination unit is further configured to:
acquire a detection value of a pressing force applied to the manipulation panel; and
determine the pressing amount based on the detection value of the pressing force, and
the input device further includes a correction unit configured to correct the pressing force based on the detected motion.

8. The input device according to claim 1, wherein each region of the plurality of regions of the manipulation panel has a plurality of staged determination thresholds.

9. An apparatus, comprising:
a manipulation panel that includes a plurality of regions, wherein
the manipulation panel is configured to receive an input manipulation, and
the manipulation panel has a plurality of long sides and a plurality of short sides;
a motion detector configured to detect a motion of the apparatus; and
an information processing device that includes:
an acquisition unit configured to acquire a detection value of a pressing force based on the input manipulation on the manipulation panel;
a pose detector configured to:
detect a pose of the apparatus based on the detected motion; and
distinguish between a first holding state and a second holding state of the apparatus in the detected pose based on the detected motion, wherein
the first holding state corresponds to a state in which a first short side of the plurality of short sides is user held,
the second holding state corresponds to a state in which a second short side of the plurality of short sides is user held,
the first short side is opposite to the second short side, and
each of the first short side and the second short side is shorter than each long side of the plurality of long sides;
a determination threshold controller configured to variably control a plurality of determination thresholds corresponding to the plurality of regions, wherein
the plurality of determination thresholds is variably controlled based on one of the first holding state or the second holding state of the apparatus of the detected pose,
each determination threshold of the plurality of determination thresholds corresponds to a respective region of the plurality of regions of the manipulation panel,
the plurality of determination thresholds includes a first determination threshold and a second determination threshold, and
the first determination threshold is different from the second determination threshold; and
a pressing-amount determination unit configured to determine a pressing amount of the input manipulation based on:
the detection value of the pressing force, and
the control of the plurality of determination thresholds.

10. An information processing method, comprising:
receiving an input manipulation on a manipulation panel of an apparatus, wherein
the manipulation panel includes a plurality of regions, and
the manipulation panel has a plurality of long sides and a plurality of short sides;
detecting a motion of the apparatus;
acquiring a detection value of a pressing force based on the input manipulation on the manipulation panel;
detecting a pose of the apparatus based on the detected motion;
distinguishing between a first holding state and a second holding state of the apparatus in the detected pose based on the detected motion, wherein
the first holding state corresponds to a state in which a first short side of the plurality of short sides is user held,
the second holding state corresponds to a state in which a second short side of the plurality of short sides is user held,
the first short side is opposite to the second short side, and
each of the first short side and the second short side is shorter than each long side of the plurality of long sides;
controlling a plurality of determination thresholds variably, wherein
the plurality of determination thresholds is variably controlled based on one of the first holding state or the second holding state of the apparatus of the detected pose,
each determination threshold of the plurality of determination thresholds corresponds to a respective region of the plurality of regions of the manipulation panel,
the plurality of determination thresholds includes a first determination threshold and a second determination threshold, and
the first determination threshold is different from the second determination threshold; and
determining a pressing amount of the input manipulation based on:
the detection value of the pressing force, and
the control of the plurality of determination thresholds.

11. A non-transitory computer-readable medium having stored thereon computer-executable instructions that, when executed by a computer, cause the computer to execute operations, the operations comprising:
receiving an input manipulation on a manipulation panel of an apparatus, wherein
the manipulation panel includes a plurality of regions, and
the manipulation panel has a plurality of long sides and a plurality of short sides;
detecting a motion of the apparatus;
acquiring a detection value of a pressing force based on the input manipulation on the manipulation panel;
detecting a pose of the apparatus based on the detected motion;
distinguishing between a first holding state and a second holding state of the apparatus in the detected pose based on the detected motion, wherein
the first holding state corresponds to a state in which a first short side of the plurality of short sides is user held, the second holding state corresponds to a state in which a second short side of the plurality of short sides is user held, the first short side is opposite to the second short side, and each of the first short side and the second short side is shorter than each long side of the plurality of long sides;

controlling a plurality of determination thresholds variably, wherein the plurality of determination thresholds is variably controlled based on one of the first holding state or the second holding state of the apparatus of the detected pose, each determination threshold of the plurality of determination thresholds corresponds to a respective region of the plurality of regions of the manipulation panel, the plurality of determination thresholds includes a first determination threshold and a second determination threshold, and the first determination threshold is different from the second determination threshold; and determining a pressing amount of the input manipulation based on:

the detection value of the pressing force, and the control of the plurality of determination thresholds.

\* \* \* \* \*